Aug. 6, 1957  J. F. ANDERSON ET AL  2,801,648
CONTAINER BONDED WITH A POLYESTER-URETHANE
Filed Jan. 21, 1954
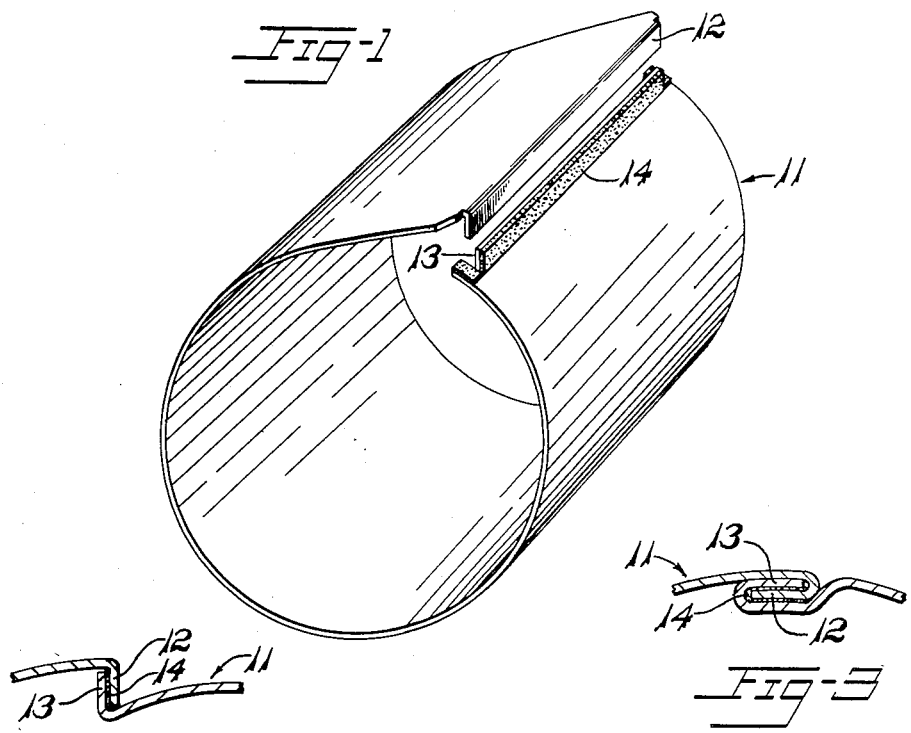
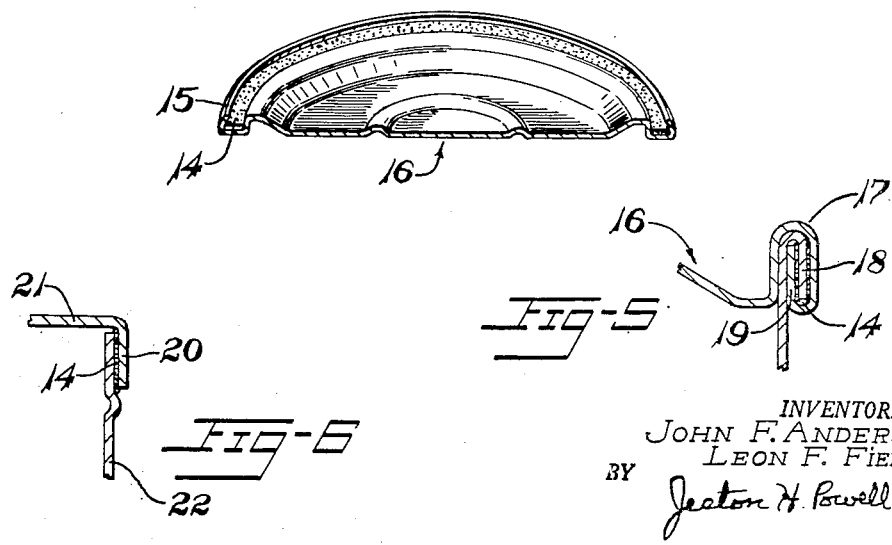
INVENTORS
JOHN F. ANDERSON
LEON F. FIEDLER
BY
Jeeton H. Powell, Jr.
ATTY.

United States Patent Office 2,801,648
Patented Aug. 6, 1957

2,801,648

CONTAINER BONDED WITH A POLYESTER-URETHANE

John F. Anderson and Leon F. Fiedler, Cuyahoga Falls, Ohio, assignors to The B. F. Goodrich Company, New York, N. Y., a corporation of New York Application January 21, 1954, Serial No. 405,329

5 Claims. (Cl. 138—74)

This invention relates to sheet metal containers having one or more seams thereof bonded with a polyester-urethane sealant and methods for making same, and it relates more particularly to sealing the side and end seams of sheet metal cans with a rigid polyester-urethane plastic and the container produced thereby.

Lead-tin and other metal alloy solders long have been used to seal junctions of metal surfaces. In the can making art metal alloy solders have been used for many years to solder the side or end seam closures of sheet metal containers. Metal alloy solders have many disadvantages in this application. Usually a highly acid flux must be employed to make the metal receptive to the solder. The flux is difficult to remove completely and thus becomes a source of corrosion. The solder will not adhere to organic coatings, and therefore an uncoated margin must be left on predetermined portions of coated sheet which are to receive the solder. Also, solder is applied to the container in the molten state and at high temperatures, and this tends to scorch organic coatings and to oxidize metals adjacent a soldered seam. The scorched or oxidized areas are quite susceptible to chemical action of the container contents. In addition such areas are unsightly. Some processing difficulties are inherent in making and using metal cans whose side seam has been soldered with a metal alloy solder. Of more pressing importance is the fact that the world supply of tin is decreasing or may not be available for other reasons. Faced with these problems the industry has attempted to find substitutes for lead-tin solder for use in containers for many years. Some plastic type materials have been employed in such applications, but for a variety of reasons no one of them has found wide acceptance.

One object of this invention is to provide a container with an organic bonding agent at the junction of metal surfaces to provide a bond which is equal or superior to metal alloy solder. Another object of the invention is to provide a container which may be used in a variety of applications including packaging of solvents, foods, oils, corrosive chemicals and the like.

Another object is to provide a container with an organic bonding agent that can be applied over organically coated portions of the seams without reducing seam strength.

It is still another object of this invention to provide a process for bonding metal surfaces with an organic bonding agent which method is less troublesome and as fast or faster than the process that now must be employed with lead-tin solder. Numerous other objects will be apparent from the description of the invention which follows:

The above-listed objects and many more are realized with a metal container article bonded with the hereinafter-defined rigid polyester-urethane thermoplastic and the described process for making same.

Referring to the drawing:

Fig. 1 is a perspective view of a sheet metal blank having a polyester-urethane bonding agent deposited along one of the body hooks of the side seam preparatory to final assembly of a lock and lap side seam container.

Fig. 2 is a vertical section along the side seam of a sheet metal container just prior to bumping the body hooks together and showing a layer of organic bonding agent between adjacent surfaces of the body hooks.

Fig. 3 is a vertical section through a completed body hook and the lock portion of a side seam, on an enlarged scale.

Fig. 4 is a section of an inverted container end showing the organic bonding agent adjacent the edge curl of the end.

Fig. 5 is a vertical section on an enlarged scale of a completed double seam, showing the organic bonding agent intercalated between the layers of metal.

Fig. 6 is a section on an enlarged scale through a lap end seam showing the organic bonding agent interposed between the body wall of the container and the downwardly depending skirt of the end.

The container bonded with the hereinafter-defined rigid, polyester-urethane thermoplastic is outstanding in its versatility and usefulness. It has been found that sheet metal containers sealed with these polyester-urethane materials are readily manufactured and the container seals are outstandingly resistant to attack by corrosive chemicals and are resistant to the solvent action of many powerful solvents which will even dissolve such plastics as nylon. The bond established between the defined polyester-urethane and the surfaces of the container which are joined are greatly superior to those obtained with lead-tin solder. The polymer bonded articles of this invention are resistant to heat and such sheet metal can articles may be sterilized, for instance, as in packaging food with no difficulty. Container articles sealed with the particular polyester-urethanes of this invention may be used for a variety of applications. An important advantage accruing from the use of this invention is that the process may be employed with only minor changes in conventional equipment. A further advantage is that the polyester-urethanes may be employed to bond metal surfaces which have been coated with organic materials which is not true in the case of tin solder, special precautions having to be taken in such a case so that portions of the metal are blank and free of any coating because metal-alloy solder will not adhere to organically coated plate.

The containers of this invention may be made from a variety of metal materials which may or may not be coated with an outer protective layer such as tin, aluminum, zinc and the various protective organic coatings such as resins, varnishes, synthetic polymers, with or without pigments and the like. Iron base metal sheets are those which are most widely used in making the container articles of this invention and those coated with tin and/or organic protective coatings are most useful. The polyester-urethane thermoplastics used to make the articles of manufacture of this invention are disclosed in the co-pending application of Charles Schollenberger, Serial No. 361,833, filed June 15, 1953.

The rigid polyester-urethane thermoplastic is prepared by first reacting certain hereinafter-defined glycols and dibasic organic acids in order to form a particular kind of polyester of a critical molecular weight range, and then reacting the polyester with critical amounts of an organic diisocyanate. The resulting essentially linear product is a hard, tough, crystalline, rigid, chemically-resistant thermoplastic with outstanding bonding and adhesive characteristics. The means to vary the softening point range as desired or required is set forth in more detail hereinafter. The polyester-urethanes of this invention preferably have a softening point range of about 100 to about 200° C., although this may be lower or higher by suitable modification. The products are soluble to some extent only in the more powerful solvents such as dimethyl formamide, tetramethyl urea and the like, while the ordinary polyester-urethane rubbers before cross linking are soluble in ketones.

The polyester preferred for use in this invention is an essentially linear hydroxyl terminated polyester having a molecular weight from about 250 to 1500, and an acid number from about 0 to 10. More preferably the polyester has a molecular weight from about 400 to 1000, it being understood that the molecular weight of such polymeric esters is an average molecular weight, and an acid number from 0 to 5.0. The molecular weight is determined by assay of terminal functional groups. Mixtures of glycols and dibasic acids may be used so long as the end product is a crystalline, rigid, thermoplastic adhesive material.

The polyester is prepared ordinarily by an esterification reaction of an aliphatic dibasic (dicarboxylic) acid or an anhydride thereof with a glycol, the preferred reactants being tetramethylene glycol and adipic acid. Molar ratios of more than one mol of glycol to acid are preferred so as to obtain linear chains containing a preponderance of terminal hydroxyl groups. The acid or its anhydride, and the glycol are reacted together by heating at a temperature below about 190° C. for a time and at a temperature substantially equivalent to heating at 185° C. at atmospheric pressure for 4 to 6 hours and then gradually reducing the pressure to 30 to 60 mm. of mercury for 4 to 6 hours and finally for 4 to 10 hours at about 1.5 mm. During the heating period, most of the water of esterification and excess glycol are removed and this may be facilitated by bubbling nitrogen through the molten mass. Ordinarily, the lower molecular weight polyesters are obtained by decreasing the time of heating in the last step at the lower pressure. Esterification under the above conditions results in hydroxyl polyesters of a waxy low-melting nature, having molecular weights of about 400 to 1500. The polyester is preferably kept in an essentially anhydrous condition to eliminate the possibility of excessive cross-linking from the polyisocyanate reaction.

The basic polyesters utilized include polyesters prepared from the esterification of such dicarboxylic acids as adipic, succinic, maleic, fumaric, methyl succinic, di-, tri-, and tetra-methyl succinic, pimelic, glutaric, suberic, azaeleic, sebacic and the like. Mixtures of these acids, or their anhydrides may also be employed and mixtures of the above aliphatic dicarboxylic acids may be employed with lesser amounts of aromatic dicarboxylic acids such as meta- and paraphthalic acids, although if such aromatic acids be employed, it is preferred to keep the concentration low. Useful dibasic acids are those containing 4 to 10 carbon atoms. Preferred acids are those of the formula HOOC—R—COOH where R is an alkylene radical containing 2 to 8 carbon atoms. More preferred groups are those represented by the formula HOOC(CH$_2$)$_x$COOH where X is a number from 2 to 4. Adipic acid is preferred.

The glycols utilized in the preparation of the polyester by reaction with the dicarboxylic acid may be tetramethylene glycol, pentamethylene glycol, 2-methyl butanediol-1,4, hexamethylene glycol, heptamethylene glycol, octamethylene glycol and the like. In general the glycol employed is an aliphatic glycol containing 4 to 10 carbon atoms and is preferably a glycol of the general formula HO—(CH$_2$)$_x$—OH where X is 4 to 6 and the preferred glycol is tetramethylene glycol (1,4-butanediol). Mixtures of glycols may be employed. Only small amounts of trifunctional alcohols such as glycerol should be present so as to decrease the possibility of extensive cross-linking since the preferred polyesters of this invention are essentially linear.

In the practice of the invention, a substantially linear, essentially hydroxyl terminated polyester characterized as above is reacted with an organic diisocyanate, preferably an aromatic diisocyanate, thereby producing an essentially linear, thermoplastic, rigid polyester-urethane. As has been described, the type and amount of polyester and diisocyanate are critical, and variation within the critical limits results in polyester-urethanes with variable ranges of softening points. The molar proportion of diisocyanate to polyester is preferably about 1:1 and may be as high as 1.5 to 1.0 or as low as 0.9 to 1.0 if desired. In a preferred embodiment of the invention the molecular weight range of the polyester, polytetramethylene adipate, for example, is about 400 to 900 and the amount of diisocyanate, paraphenylene diisocyanate or 1,5-naphthylene diisocyanate, for example, is in a ratio of 0.9 to 1.1 mols per mol of polyester. These ratios result in rigid polyester-urethane thermoplastics with softening point ranges of about 100° C. to about 200° C. It is understood that the softening points of high-molecular weight polymers are not sharp and these values are reasonable approximations. Other suitable variations with other reactants will be apparent to those skilled in the art.

A preferred procedure for carrying out this latter reaction is to heat under substantially anhydrous conditions the one mol of polyester in a glass or metal reactor equipped with a stirrer to a temperature of 50 to 100° C. at which temperature it melts, and then to stir in a finely-divided aromatic diisocyanate and continue stirring and heating until the reaction mass reaches a dough-like consistency, at which point it is discharged from the reactor and allowed to cool. It may be desirable to continue heating the mass after discharge from the reactor. Many obvious variations of this reaction procedure are apparent. For example, the reactants may be premixed, heated at the reaction temperature until thickening begins and then poured into suitable containers and then heated in an oven to complete the reaction.

The organic polyisocyanates employed in the invention are organic diisocyanates and preferably aromatic diisocyanates. Useful diisocyanates include hexamethylene diisocyanate, tetramethylene diisocyanate and the like, 1,5-naphthylene diisocyanate, diphenylmethane-p,p'-diisocyanate, triphenylmethane-p,p'-diisocyanate, metatoluylene diisocyanate, phenylene diisocyanates and the like, and more preferably para-phenylene diisocyanate, 1,5-naphthylene diisocyanate and benzidine diisocyanate. Mixtures of diisocyanates of course may be employed.

The amount of diisocyanate to be employed in the reaction with the polyester may be varied to vary the softening point of the polyester-urethane, but must be kept within a critical range. Ordinarily when one mol of polyester is used as a basis for the reaction, about one mol of diisocyanate will be employed, but as is shown in the examples, the amount of diisocyanate may be varied from about 0.9 mol to 1.5 mols, and preferably to 1.1 mols.

The resulting reaction products, polyester-urethanes, are hard, rigid, thermoplastic, essentially linear, crystalline products which are chemically resistant and are insoluble in ordinary organic solvents, a strong solvent such as tetramethyl urea being required to dissolve the polymer, although, quite surprisingly, containers bonded with the polyester-urethanes herein described will hold dimethyl formamide. The polymers have a hardness greater than 100 on an "A" durometer, preferably in the range of 25 to 60 on a "D" durometer. They soften preferably between 100 and about 200° C. and may be repeatedly softened and hardened by application of heat without materially affecting the adhesive properties. The products are resistant to shock and do not shatter on impact as do most unplasticized thermoplastics. They are particularly outstanding in adhesive properties. The term "rigid" applied to the polyester-urethane thermoplastics of this invention means a hard, dimensionally stable product of low extensibility at room temperature, which, however, is flexible in thin sections.

Method steps in which the container seals or bonds are formed can be effected in a variety of ways. For example, the polyester-urethane may be applied to metal or organic coated metal surfaces by any means, usually heating, so that intimate contact is obtained between the two surfaces desired to be bonded. Fig. 1 shows a partially assembled sheet metal can body 11 having an outer side seam hook 12, and an inner side seam hook 13, which has deposited along its length a layer of the polymeric bonding agent 14 of this invention. The polyester-urethane is applied during the body forming step prior to the final bump, and is melted and/or extruded onto the inner side seam hook 13 of a can body 11, and just prior to the final bump the outer and inner side seam hooks are brought into close proximity to each other and the softened polyester-urethane contacts the adjacent surface of the outer side seam hook, as shown in Fig. 2. After bumping, the side seam seal has a layer of the bonding polymer adjacent the metal surfaces of the hooks and in the spaces between the metal portions of the side seam to form a strong, hermetic side seam as shown in Fig. 3. During the bumping operation, the plastic polyester-urethane is spread over the lap areas of the side seam, thereby providing a bond along the entire length of the seam. Another useful method is to extrude the polyester-urethane in narrow strips or in a sheet which is cut into narrow strips, said strips preferably being from about 0.005 to 0.03 inch thick and from about 1/32 to 1/8 inch wide, and applied during can construction by folding together the two side seam body hooks of the can body over the extruded polyester-urethane and heating the area around the junction, as with a gas flame or electronically, with a hot gas or otherwise as desired so as to soften the polyester-urethane, and a final bump given to seal the unit. Alternatively, the inner body hook of the partially formed can body may be heated, the strip of polyester-urethane applied thereto and the can assembled at once. Cement applications may be useful in applying the polyester-urethane to the edges of the flat body blank which is then heated after the can body is formed, but prior to the final bump, and the marginal edges interfolded and bumped. It will be obvious to the man skilled in the art that many ways are available to apply the polyester-urethanes as a seam sealant for cans.

The polyester-urethanes also may be used in place of the sealing compound now used in the curl of can ends. The polyester-urethane 14 may be applied adjacent the can end curl as shown in Fig. 4. This can be done by melting and/or extruding the polyester-urethane or the polymer can be deposited adjacent the end curl in the form of a dispersion or emulsion. The polyester-urethane can also be applied to the end in the form of strips or gaskets, and the area of the end heated to cause it to adhere to the can parts. The polymer is extremely resistant to solvent action and its use as a gasket in the ends of a can make it possible to pack many materials which readily disintegrate the usual rubber base can end sealing compounds of metal. Fig. 5 shows a completed double end seam 17 made by interfolding the body hook 18 with the can end hook 19, with the polyester-urethane 14 intercalated between the layers. Fig. 6 shows a lap seam in which the depending skirt 20 of an end 21 is bonded to a metal can body 22 by a layer of polyester-urethane polymer 14 disposed between the body wall and the skirt of the end. Regardless of how the polyester-urethane sealant is applied, a container is obtained which has unusual seam strength as compared to cans in which the side seam has been sealed with metal alloy solder. The strength of the articles of this invention often exceed from 2 to 3 times that of conventional lead-tin soldered cans. The cans sealed with the polyester-urethane are extremely resistant at the seam to action of solvents, corrosive chemicals, shattering from impact, pressure, low temperature shrinkage and are non-toxic when used in food packaging. They may be sterilized at the usual sterilization temperatures many times without effecting the strength of the bond, if a polymer with a sufficient high softening point is used.

The polyester-urethane sealant may be employed with a variety of metal materials used to make can articles such as sheet black iron coated with tin (the usual tin can stock), varnish coated black iron, lithographed metals, vinyl polymer coated metals, aluminum coated, oil modified amine aldehyde resin coated metals, oil modified phenol aldehyde resin coated metal, and other organic coatings that are used to coat metal containers and the like.

A major problem in the construction of can bodies employing plastic sealants is the processing temperature of the sealant. As has been described hereinabove, the polyester-urethanes of this invention may, by suitable variation in preparation, be prepared so as to have a wide variety of melting points, even as high as 250° C. and as low as desired for ease of application, depending upon the end use of the can article. For example, cans meant for oils need not be sterilized and a polyester-urethane softening, for example, at 120° C. may be employed and is much easier to handle and apply.

The preparation and applications of typical embodiments of the invention are to be found in the following examples which are also given to illustrate the practice of the invention and to more clearly demonstrate its use.

*Examples 1 through 3*

Three polyesters are prepared by an esterification reaction of an excess of tetramethylene glycol with adipic acid, and by varying the amount of heating in the final step as described above, polytetramethylene adipates of molecular weights of 406, 847 and 995 are obtained. These three polyesters are then reacted with paraphenylene diisocyanate in a molar ratio of 1:1 by heating in a stirred container until the reaction mass becomes too viscous to stir easily, poured into coated containers and allowed to age or are heated for several hours above 100° C. The resulting polyester-urethane products have softening points of 150° C., 110° C. and 85° C., thus showing that the softening point of the reaction product may be controlled, and that the softening point may be increased by decreasing the molecular weight of the polyester, and decreased by employing higher molecular weight polyesters, the molar ratio of the two reactants being held constant.

*Examples 4 through 7*

In these examples the molecular weight of the polyester is held constant and the molar ratio of reactants is varied. One mol of polytetramethylene adipate having a molecular weight of about 847 is reacted in successive portions with the following tabulated mols of para-phenylene diisocyanate. The softening points obtained are set forth in the table below:

| Reactants, mol ratio—p-phenylene diisocyanate:polyester | Softening point, °C. |
|---|---|
| Example 4 | 0.97:1.00 | 90 |
| Example 5 | 1.00:1.00 | 110 |
| Example 6 | 1.03:1.00 | 125 |
| Example 7 | 1.06:1.00 | 200 |

The softening point may be varied also by varying the molar ratio of the reactants, and generally by increasing the amount of diisocyanate reacted, a higher softening point material may be obtained.

*Example 8*

Samples of polyester-urethanes having softening points of about 140, 190 and 240° C., prepared as described in Examples 4 through 7, are melted and applied successively to tin can body blanks by melt extrusion to the inner side seam hook of a partially formed can body as in Figure 1 prior to bumping and then bumped to form the side seam seal as in Figure 3. These can bodies are outstanding in that the container as a unit is much stronger than is the case of cans bonded with lead-tin solder and has outstanding resistance to corrosive materials; and is also resistant to solvents and to the effects of sterilization temperature and the like.

*Example 9*

Test samples consisting of two pieces of varnish-covered tin can body stock 1 inch wide are bonded with the polyster-urethanes described in Examples 4 through 7 and pull strengths of greater than 200 pounds are required to break the bond. This is to be compared to only about 100 pounds pull required to separate a bond of varnish-free tin body stock of a suitable 70–30 lead-tin solder. By other tests, values of 100 pounds pull for the bond of this invention are obtained, compared to 40 pounds pull for lead-tin solder.

*Example 10*

A rigid polyester-urethane made with about 0.97 mol of para-phenylene diisocyanate and one mol of polytetramethylene adipate which has a softening point of about 180° C. is extruded through a die in a strip about ¾ inch wide and .04 to .06 inch thick and cold drawn to a thickness of .006 to .012 inch. This material is then cut into strips and applied to heated inner side seam hooks of partially formed can bodies which are immediately interlocked while being heated and bumped. This can body is readily made into a useful finished container whose ends also can be sealed with a polyester-urethane thermoplastic, which for convenience has a lower softening point than the product applied to the side seam seal.

Although the polyester-urethane sealant is particularly useful for use in sealing containers with interlocking side seams, it is also outstanding as compared to tin solder when employed for a simple overlapped seam, and as has been pointed out, for the double seam used when can ends are formed.

Although representative embodiments of the invention have been specifically described, it is not desired or intended that the invention be limited solely thereto as it will be apparent to those skilled in the art that modifications and variations may be made without departing from the spirit and scope of the invention as defined in the appended claims.

We claim:

1. An article of manufacture comprising a metal base container having at least one of its seams bonded with a polyester-urethane of one mol of an essentially linear polyester of a glycol containing 4 to 10 carbon atoms and a dibasic aliphatic acid containing 4 to 10 carbon atoms, said polyester having a molecular weight from 250 to about 1500, reacted with about 0.9 to about 1.5 mols of an organic diisocyanate.

2. An article of manufacture comprising a sheet metal base container having at least one of its seams bonded with a hard thermoplastic polyester-urethane of one mol of an essentially linear polyester of a glycol having the formula $HO(CH_2)_xOH$ where X is a number from 4 to 8 and a dibasic aliphatic acid having the formula $HOOC-R-COOH$ where R is an alkylene radical containing 2 to 6 carbon atoms, said polyester having a molecular weight from about 400 to about 1000, reacted with about 0.9 to 1.5 mols of an aromatic diisocyanate.

3. An article of manufacture comprising a sheet metal body having at least one seam sealed with an essentially linear, rigid, thermoplastic polyester-urethane of one mol of an essentially linear essentially hydroxyl terminated polyester of a glycol having the formula $HO(CH_2)_xOH$ where X is a number from 4 to 6 and a dibasic aliphatic acid having the formula $HOOC(CH_2)_xCOOH$ where X is a number from 2 to 4, said polyester having a molecular weight from 400 to 1000, reacted with about 0.9 to 1.1 mols of an aromatic diisocyanate selected from the group consisting of para-phenylene diisocyanate, 1,5-naphthylene diisocyanate and benzidine diisocyanate.

4. An article of manufacture comprising a tin-coated iron base sheet metal body having side seams, the side seams of which are sealed with an essentially linear, rigid, thermoplastic polyester-urethane of an essentially linear essentially hydroxyl terminated polyester of a glycol having the formula $HO(CH_2)_xOH$ where X is a number from 4 to 6 and a dibasic aliphatic acid having the formula $HOOC(CH_2)_xCOOH$ where X is a number from 2 to 4, said polyester having a molecular weight from 400 to 1000, one mol of polyester reacted with 0.9 to 1.1 mols of an aromatic diisocyanate selected from the group consisting of para-phenylene diisocyanate, 1,5-naphthylene diisocyanate and benzidine diisocyanate.

5. A container comprising a tin can body having a side seam, the side seam of which is sealed with an essentially linear, rigid, thermoplastic polyester-urethane of an essentially hydroxyl terminated polyester of tetramethylene glycol and adipic acid, said polyester having a molecular weight from 400 to 1000, one mol of polyester reacted with about 1 to 1.1 mols of para-phenylene diisocyanate.

References Cited in the file of this patent

UNITED STATES PATENTS

| 2,282,827 | Rothrock | May 12, 1942 |
| 2,346,619 | Schrader | Apr. 11, 1944 |
| 2,499,923 | Karp | Mar. 7, 1950 |
| 2,609,963 | Watson et al. | Sept. 9, 1952 |